US008857175B2

(12) United States Patent
Geiger

(10) Patent No.: US 8,857,175 B2
(45) Date of Patent: Oct. 14, 2014

(54) TWO-STAGE SUBMERSIBLE ACTUATORS

(75) Inventor: David Geiger, Orchard Park, NY (US)

(73) Assignee: Moog Inc., East Aurora, NY (US)

( * ) Notice: Subject to any disclaimer, the term of this patent is extended or adjusted under 35 U.S.C. 154(b) by 685 days.

(21) Appl. No.: 13/131,980

(22) PCT Filed: Dec. 5, 2008

(86) PCT No.: PCT/US2008/013435
§ 371 (c)(1), (2), (4) Date: May 31, 2011

(87) PCT Pub. No.: WO2010/065023
PCT Pub. Date: Jun. 10, 2010

(65) Prior Publication Data

US 2011/0232474 A1 Sep. 29, 2011

(51) Int. Cl.

| | |
|---|---|
| ***B60T 17/22*** | (2006.01) |
| ***F01B 1/00*** | (2006.01) |
| ***E21B 33/06*** | (2006.01) |
| ***F15B 21/00*** | (2006.01) |
| ***E21B 33/035*** | (2006.01) |

(52) U.S. Cl.
CPC ............. *E21B 33/0355* (2013.01); *E21B 33/06* (2013.01); *F15B 21/006* (2013.01)
USPC ............................................... 60/534; 91/159

(58) Field of Classification Search
CPC ........ B60T 17/22; F15B 7/005; F04B 43/067; F01B 17/04
USPC .............. 60/398, 534, 571, 545; 91/159, 156, 91/152, 151; 417/383; 251/1.1-1.3
See application file for complete search history.

(56) References Cited

U.S. PATENT DOCUMENTS

| | | | | | |
|---|---|---|---|---|---|
| 3,933,338 | A | * | 1/1976 | Herd et al. | 251/63.6 |
| 4,509,405 | A | * | 4/1985 | Bates | 91/420 |
| 4,622,884 | A | * | 11/1986 | Buchl | 91/445 |
| 4,789,313 | A | * | 12/1988 | Tower et al. | 417/388 |
| 5,901,633 | A | * | 5/1999 | Chan et al. | 92/5 R |
| 6,142,059 | A | * | 11/2000 | Chan et al. | 92/5 R |
| 6,250,199 | B1 | * | 6/2001 | Schulte et al. | 91/4 R |
| 6,651,749 | B1 | * | 11/2003 | Kilgore | 166/387 |
| 2006/0239840 | A1 | * | 10/2006 | Hembree | 417/383 |
| 2008/0264646 | A1 | * | 10/2008 | Sten-Halvorsen et al. | 166/360 |

* cited by examiner

*Primary Examiner* — Edward Look
*Assistant Examiner* — Daniel Collins
(74) *Attorney, Agent, or Firm* — Phillips Lytle LLP

(57) ABSTRACT

The present invention provides an improved two-stage actuator (20) that broadly includes: a first cylinder (21); an intensifier piston (22) mounted in the first cylinder for sealed sliding movement therealong, the intensifier piston having a large-area surface (26) exposed to ambient pressure, and having a small-area surface (30); a second cylinder (23) having an end wall (36); an actuator piston (24) mounted in the second cylinder for sealed sliding movement therealong; an actuator rod (39) connected to the actuator piston for movement therewith and having an intermediate portion sealingly penetrating the second cylinder end wall; the actuator piston having a large-area surface (27) and a small-area surface (37), an intermediate chamber (35) communicating the intensifier piston small-area surface with the actuator piston large-area surface; and an incompressible fluid in the chamber; whereby ambient pressure (i.e., the pressure of sea water at the depth at which the device is submerged) will create pressure in the intermediate chamber for urging the actuator piston to move toward the second cylinder end wall.

16 Claims, 3 Drawing Sheets

TWO-STAGE SUBMERSIBLE ACTUATORS

TECHNICAL FIELD

The present invention relates generally to improved actuators for operating in a submerged environment, and, more particularly, to improved two-stage actuators which are adapted to be used on the sea floor in connection with the operation of oil field equipment.

BACKGROUND ART

In subsea oil exploration, a so-called "Christmas tree" is sometimes placed on the wellhead. The wellhead, itself, may be located many thousands of feet below the sea surface. Such a "Christmas tree" commonly has various valves, including a blow-out preventer ("BOP") to prevent the unintended discharge of hydrocarbons into the sea.

With existing applications, however, such valves are often operated hydraulically by providing pressurized hydraulic fluid from a surface ship down to the wellhead. (See, e.g., U.S. Pat. Nos. 4,864,914 and 7,424,917 B2.) In some cases, the wellhead may be as much as ten-thousand feet below the sea surface. The pressure drop experienced in transmitting pressurized fluid through a pipe for some ten-thousand feet can be very large, and can reduce the usable pressure available at the sub-surface wellhead. Other devices rely on surface-powered power sources. (See, e.g., U.S. Pat. Nos. 7,159,662 B2, 4,095,421 and 3,677,001.)

In many cases, it is desired to provide such a blow-out preventer with a fail-safe feature. Should there be a failure, for whatever reason, an actuator will close a valve to prevent hydrocarbons from being released from the wellhead into the sea. With a tethered system, a failure of the surface-to-wellhead umbilical, may itself result in the loss of pressure sufficient to operate the actuator.

Some subsea devices have been developed, but these often are actuated by a compressed spring. (See, e.g., U.S. Pat. Nos. 7,108,006 B2, 6,125,874 and U.S. Re. 30,114.)

Accordingly, it would be generally desirable to provide a submersible electrohydraulic actuator that would be not require such an umbilical connection to a source of power (i.e., hydraulic or electrical) on a surface ship, and which would provide a source of fluid pressure that would be available to operate the valve in the event of a sensed failure or on command.

DISCLOSURE OF THE INVENTION

With parenthetical reference to the corresponding parts, portions or surfaces of the disclosed embodiment, merely for purposes of illustration and not by way of limitation, the present invention provides an improved two-stage actuator (20) that broadly includes: a first cylinder (21); an intensifier piston (22) mounted in the first cylinder for sealed sliding movement therealong; the intensifier piston having a large-area surface (26) exposed to ambient pressure, and having a small-area surface (30); a second cylinder (23) having an end wall (36); an actuator piston (24) mounted in the second cylinder for sealed sliding movement therealong; an actuator rod (39) connected to the actuator piston for movement therewith and having an intermediate portion sealingly penetrating the second cylinder end wall; the actuator piston having a large-area surface (27) and a small-area surface (37); an intermediate chamber (35) communicating the intensifier piston small-area surface with the actuator piston large-area surface; and an incompressible fluid in the chamber; whereby ambient pressure (i.e., the pressure of sea water at the depth at which the device is submerged) will create pressure in the intermediate chamber for urging the actuator piston to move toward the second cylinder end wall.

The first cylinder has an end wall (32), and the improved actuator may further include: an intensifier rod (31) connected to the intensifier piston for movement there-with and having an intermediate portion sealingly arranged within or penetrating the first cylinder end wall. In one form, the annular surface of the intensifier piston about the intensifier rod may constitute the intensifier piston small-area surface. In another form, the intensifier rod has an end surface (30) that constitutes the intensifier piston small-area surface.

The chamber (34) surrounding the intensifier rod between the first cylinder end wall and the intensifier piston contains a compressible gas at or below the ambient pressure.

The actuator is adapted to be submerged in a liquid. The ambient pressure is the pressure of the liquid at the depth at which the two-stage actuator is submerged. The ambient liquid may be sea water.

The first and second cylinders may be either connected to one another, or physically separated.

The intermediate chamber (35) may be filled with a suitable hydraulic fluid, such as oil.

The improved actuator may further include: a pump (42) operatively arranged to selectively pump fluid between a tank a (49) and the small-area actuator chamber (41) surrounding the actuator rod between the second cylinder end wall and the actuator piston.

The actuator may have a first valve (44) for determining the direction of fluid pumped by the pump. The first valve may be electrically operated, and may be biased toward a position that communicates the small-area actuator chamber with the tank. The pressure in the tank may be at ambient pressure.

The improved actuator may further include: position transducer (40) operatively arrange to determine the position of the actuator piston relative to the second cylinder.

A second valve (51) may be connected between the first valve (44) and the small-area actuator chamber (41). This second valve may be electrically operated, and may be biased toward a position that communicates the chamber surrounding the actuator rod between the second cylinder end wall and the actuator piston with the tank.

Accordingly, the general object of the invention is to provide an improved two-stage actuator.

Another object is to provide an improved submersible actuator.

These and other objects and advantages will become apparent from the foregoing and ongoing written specification, the drawings, and the appended claims.

DESCRIPTION OF THE PREFERRED EMBODIMENTS

Figure 1:
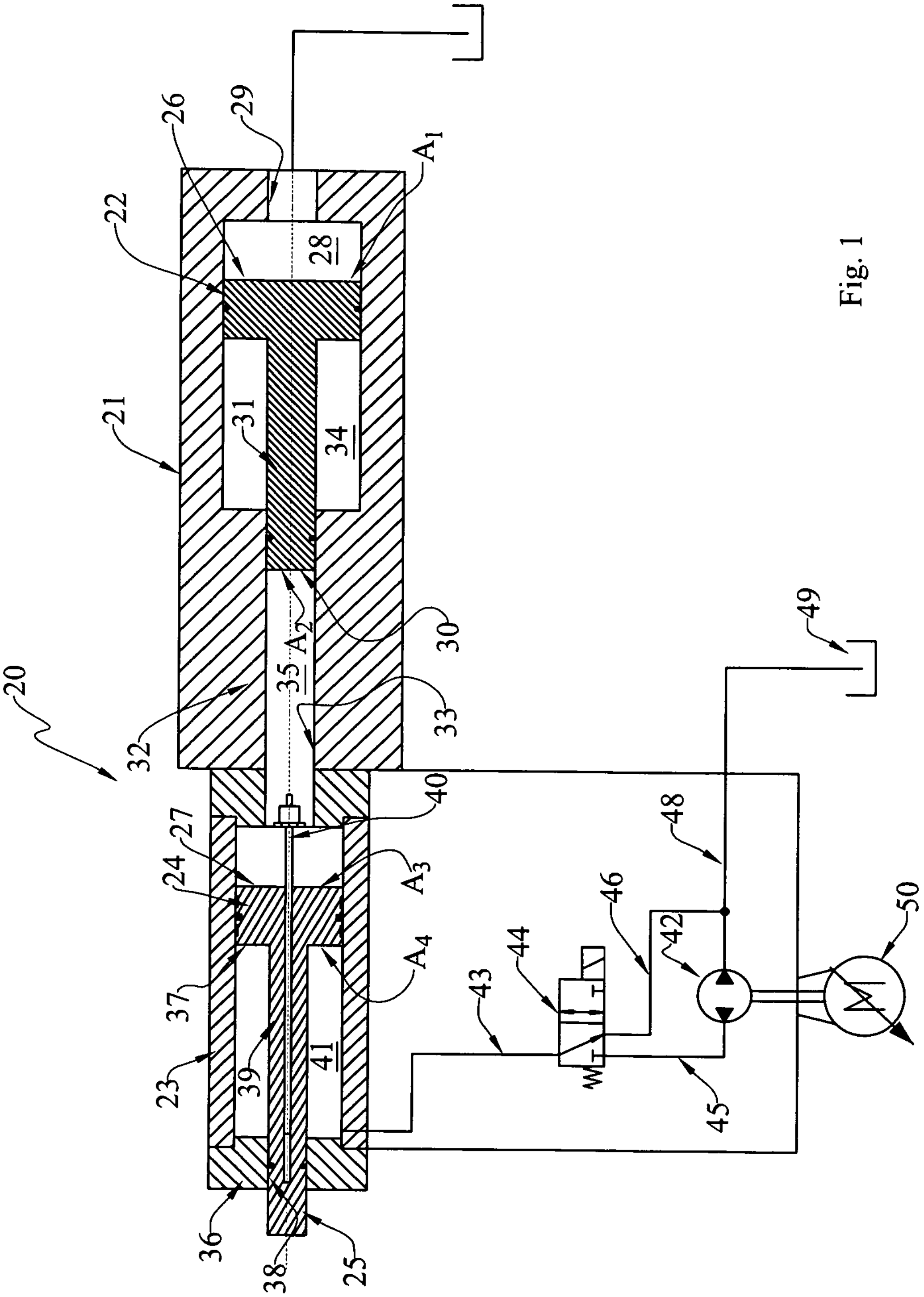
FIG. 1 is a schematic view of a first form of the improved two-stage actuator, this view showing the actuator as including a rightward intensifier piston and a leftward actuator piston.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms “horizontal”, “vertical”, “left”, “right”, “up” and “down”, as well as adjectival and adverbial derivatives thereof (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or axis of rotation, as appropriate.

Referring now to the drawings, and, more particularly, to FIG. 1 thereof, the present invention broadly provides an improved two-stage actuator, of which a first preferred embodiment is generally indicated at 20. The improved actuator is shown as including a first cylinder 21, an intensifier piston 22 mounted in the first cylinder for sealed sliding movement therealong, a second cylinder 23, an actuator piston 24 mounted in the second cylinder for sealed sliding movement therealong, and an actuator rod 25 connected to the actuator piston.

The entire two-stage actuator is adapted to be submerged in a liquid, such as sea water. More particularly, the improved actuator is adapted to be mounted on a Christmas tree adjacent a wellhead, and to provide motive force for selectively closing the wellhead, either upon the occurrence of a triggering fail-safe event or upon a suitable command.

To this end, the first cylinder 21 is shown as being a horizontally-elongated member. The intensifier piston 22 is mounted in the cylinder for sealed sliding movement therealong. The intensifier piston has a large-area rightward circular surface 26 facing into a chamber 28 which is opened via aperture 29 to ambient pressure, and as having a small-area second surface 30. In this first embodiment, the intensifier piston has a rod 31 which extends leftwardly from piston 22 and which terminates in a leftwardly-facing circular vertical rod end surface 30. In this first embodiment, rod end surface 30 constitutes the small-area surface of the piston.

The first cylinder is shown as having a horizontally-thickened end wall 32. The end wall 32 has a through-opening 33, in which distal marginal end portion of actuator rod 31 is sealingly and slidably mounted. An annular chamber 34 to the left of the intensifier piston and surrounding intensifier rod 31 is filled with a compressible gas at ambient or sub-ambient pressure. The left end face of the piston faces into a chamber 35 which contains a suitable incompressible hydraulic fluid, such as oil. While such liquids are not absolutely incompressible, they are incompressible relative to various gases.

The second cylinder 23 is shown as being an assembled device having a leftward end wall 36. End wall 36 is provided with an axial horizontal through-opening 38 that is sealingly and slidably penetrated by an intermediate portion of actuator rod 39 that extends leftwardly from actuator piston 24. The left marginal end portion of the actuator rod is located outside of the second cylinder, and is available to do work. For example, a suitable tool, such as a valve (not shown), could be mounted on the left end of the actuator rod, and, for example, might be utilized in connection with a blow-out preventer. Other types of tools might be mounted on the left end of actuator rod 25. The position of the actuator piston within second cylinder 23 is determined by a suitable position transducer, such as indicated at 40. The chamber surrounding the actuator rod 39 within the second cylinder is indicated at 41. This chamber communicates with a pump 42 via conduit 43, an electrically-operated solenoid valve 44, and conduit 45. Another conduit 46 communicates valve 44 with a conduit 48 that communicates the pump with a tank 49. The pump is driven by a motor 50.

In this first embodiment, a rightwardly-facing circular vertical face of intensifier piston 22 has a cross-sectional area $A_1$. The ambient sea pressure is admitted to chamber 28, and acts on intensifier piston face $A_1$, and urges the intensifier piston to move leftwardly within cylinder 21.

Chamber 34 contains a compressible fluid, such as a gas, or is evacuated.

Chamber 35 is filled with hydraulic fluid, such as oil. The smaller-area surface $A_2$ of the intensifier piston faces into chamber 35.

The actuator piston is shown as having a rightwardly-facing large-area annular vertical surface 27 of cross-section area $A_3$ facing into chamber 35. The actuator piston also has a smaller-area leftwardly-facing surface 37 of area $A_4$ facing into chamber 41. Chamber 41 is normally filled with a relatively incompressible fluid. The pressure of sea water in chamber 28 urges the intensifier piston to move leftwardly within the first cylinder. The smaller-area intensifier piston surface 30 of area $A_2$ pressurizes the hydraulic fluid in chamber 35. The pressure of this fluid acts on the right face 27 $A_3$ of the actuator piston. The left face 37 $A_4$ of the actuator piston faces into chamber 41.

The motor may be selectively energized to operate the pump so as to pump fluid from the tank 49 through conduits 48, 45, now-displaced valve 44, and conduit 43 into chamber 41. This urges the actuator piston to move rightwardly, causes a similar rightward motion of the intensifier piston.

Valve 44 may be a solenoid-operated valve that is normally displaced to its alternative position, thereby blocking flow from chamber 41 to the tank. However, the solenoid is biased by a spring to move toward the position shown. Thus, in the event of an electrical failure, the solenoid spring expands to displace the solenoid valve to the position shown in FIG. 1. In this position, fluid in chamber 41 may flow through conduit 43, valve 44 and connected conduits 46, 48 to the tank. As this occurs, the pressure of ambient sea water forces the intensifier piston leftwardly, causing a similar leftward movement of the actuator piston. This movement of the actuator piston may then be used to move a tool, such as a valve element toward a seat.

Figure 2:
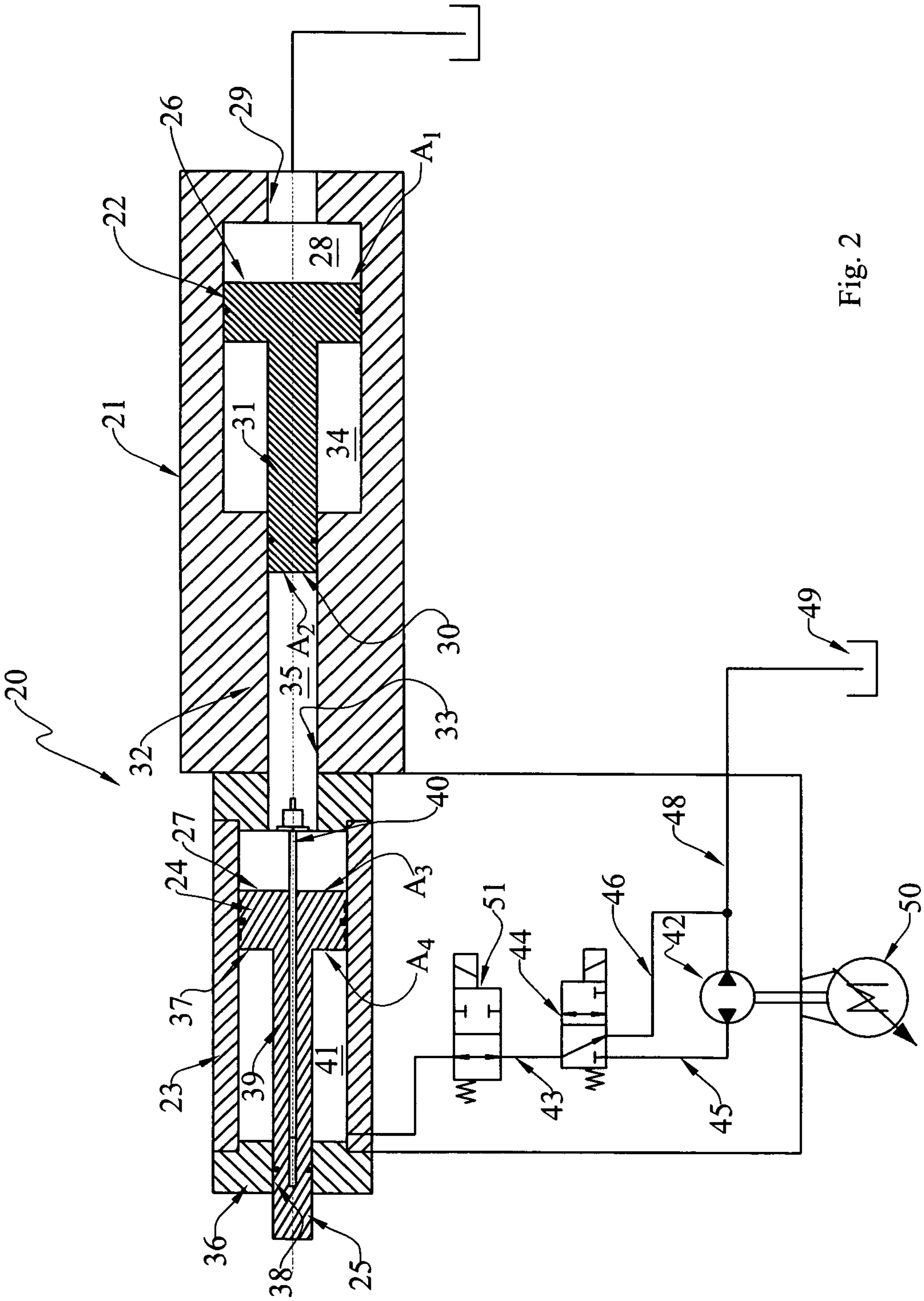
FIG. 2 is a schematic view of another form of the improved two-stage actuator, this view having a second electrically-operated valve in connection with a first such valve.

FIG. 2 is a view generally similar to FIG. 1, except that a second solenoid valve 51 is mounted in conduit 43 between chamber 41 and first valve 44. This solenoid valve may be selectively operated to block flow from the first valve to the chamber, and vice versa.

Figure 3:
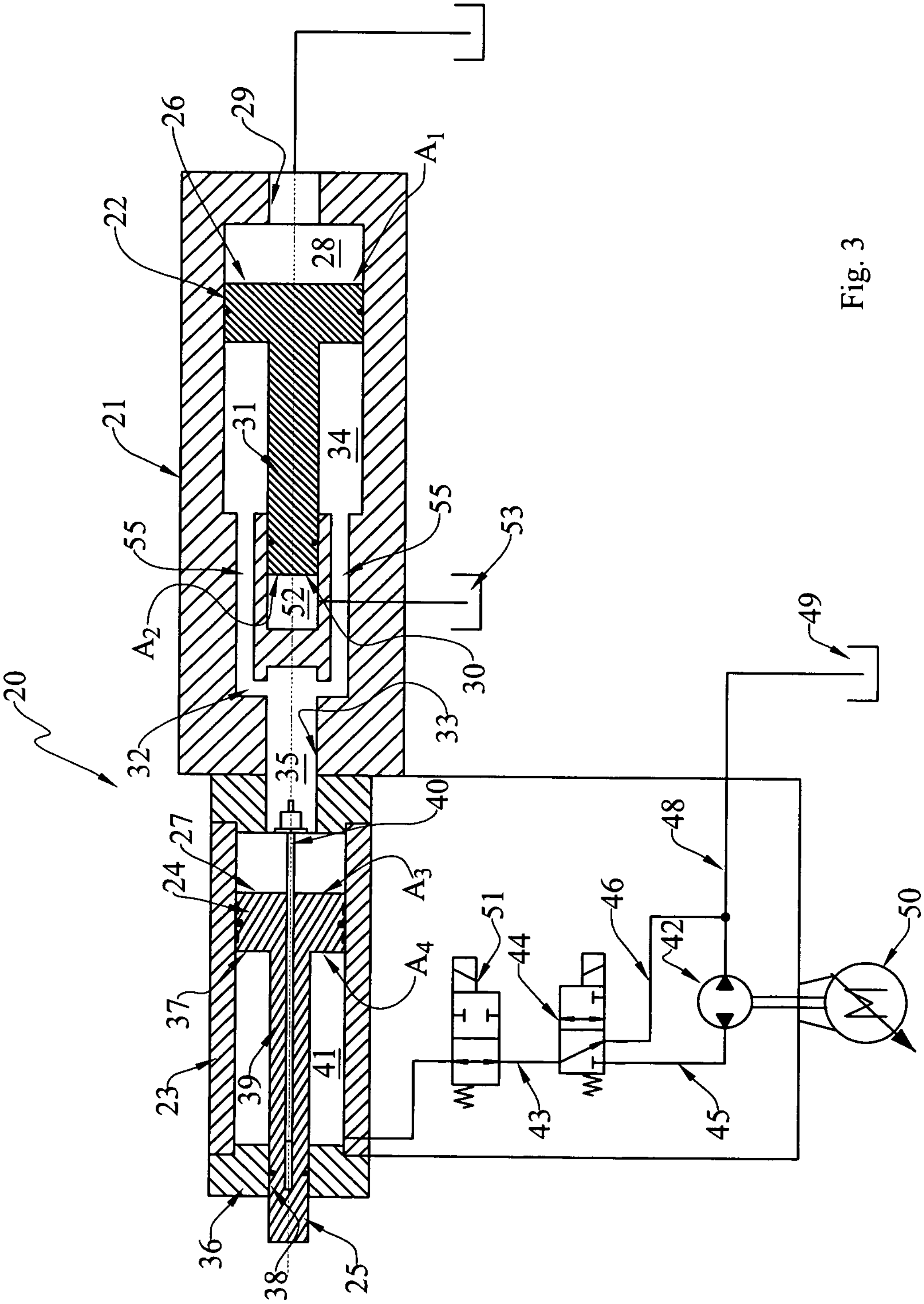
FIG. 3 is a schematic view of yet another form of the improved two-stage actuator, generally similar to FIG. 2, this embodiment showing the annular surface of the intensifier piston about the intensifier rod as communicating with the right end face of the actuator piston.

FIG. 3 is a view generally similar to FIG. 2 with the following exception. The left end face of the intensifier rod faces into a chamber 52. This chamber may be either filled with a compressible fluid, or evacuated. In yet another arrangement, as illustrated, chamber 52 is vented to the tank 53. Chamber 34 communicates with chamber 33 via conduits 54, 55 in the first cylinder. Thus, in this arrangement, the leftward annular vertical surface of intensifier piston 22 communicates via conduits 55, 55 with chamber 33. Otherwise, the valves operates the same as previously described.

MODIFICATIONS

The present invention contemplates that many changes and modifications may be made. For example, the first and second cylinders may be physically connected to one another, or may be physically separate, as desired. Various types of conduits and orifices may be used to connect the various chambers as desired. Moreover, if desired, a suitable mechanical lock (not shown) may be provided between the first cylinder and the intensifier piston or intensifier rod, or between the second cylinder and the actuator piston or actuator rod, to prevent unintended motion of the intensifier and actuator pistons.

Therefore, while several presently-preferred forms of the improved two-stage actuator have been shown and described, and several modifications thereof discussed, persons skilled in this art will readily appreciate that various changes and modifications may be made without departing from the spirit of the invention, as defined and differentiated by the following claims.

What is claimed is:

1. A two-stage actuator adapted to be submerged in a liquid to provide a source of power without any umbilical power connection to the surface of said liquid for operating a submerged actuator on a blow-out preventer, comprising:

- a first cylinder;
- an intensifier piston mounted in said first cylinder for sealed sliding movement therealong;
- said intensifier piston having a large-area surface which, in use, is continuously exposed to the pressure of said liquid at the depth at which said actuator is submerged, and having a small-area surface;
- a second cylinder having an end wall;
- an actuator piston mounted in said second cylinder for sealed sliding movement therealong;
- an actuator rod connected to said actuator piston for movement therewith and having an intermediate portion sealingly penetrating said second cylinder end wall;
- said actuator piston having a large-area surface and a small-area surface;
- an intermediate chamber communicating said intensifier piston small-area surface with said actuator piston large-area surface; and
- an incompressible fluid in said chamber;
- whereby the pressure of said liquid at the depth to which said actuator is submerged in use creates pressure in said intermediate chamber for urging said actuator piston to move toward said second cylinder end wall for operating said actuator on said blow-out preventer.

2. A two-stage actuator as set forth in claim 1 wherein said first cylinder has an end wall, and further comprising:

- an intensifier rod connected to said intensifier piston for movement therewith and having an intermediate portion sealingly penetrating said first cylinder end wall.

3. A two-stage actuator as set forth in claim 2 wherein the annular surface of said intensifier piston about said intensifier rod constitutes said intensifier piston small-area surface.

4. A two-stage actuator as set forth in claim 2 wherein said intensifier rod has an end surface that constitutes said intensifier piston small-area surface.

5. A two-stage actuator as set forth in claim 4 wherein the chamber surrounding said intensifier rod between said first cylinder end wall and said intensifier piston contains a compressible gas or a vacuum.

6. A two-stage actuator as set forth in claim 1 wherein said liquid is sea water.

7. A two-stage actuator as set forth in claim 1 wherein said first and second cylinders are connected.

8. A two-stage actuator as set forth in claim 1 wherein said intermediate chamber is filled with oil.

9. A two-stage actuator as set forth in claim 1 and further comprising:

- a valve element mounted on said actuator rod.

10. A two-stage actuator as set forth in claim 1, and further comprising:

- a pump operatively arranged to selectively pump fluid between a tank and the small-area actuator chamber surrounding said actuator rod between said second cylinder end wall and said actuator piston.

11. A two-stage actuator as set forth in claim 10 and further comprising:

- a first valve for determining the direction of fluid pumped by said pump.

12. A two-stage actuator as set forth in claim 10, wherein said first valve is electrically operated and is biased toward a position that communicates said small-area actuator chamber with said tank.

13. A two-stage actuator as set forth in claim 10 wherein the pressure in said tank is at the pressure of said liquid at the depth at which said actuator is submerged.

14. A two-stage actuator as set forth in claim 1, and further comprising:

- a position transducer operatively arranged to determine the position of said actuator piston relative to said second cylinder.

15. A two-stage actuator as set forth in claim 11, and further comprising:

- a second valve connected between said first valve and said small-area actuator chamber.

16. A two-stage actuator as set forth in claim 15, wherein said second valve is electrically operated and is biased toward a position that communicates said chamber surrounding said actuator rod between said second cylinder end wall and said actuator piston, with said tank.

* * * * *